(12) United States Patent
Chen et al.

(10) Patent No.: US 11,941,841 B2
(45) Date of Patent: Mar. 26, 2024

(54) DETERMINATION OF A LOCATIONAL POSITION FOR A CAMERA TO CAPTURE A COLLISION OF TWO OR MORE ACTORS

(71) Applicant: International Business Machines Corporation, Armonk, NY (US)

(72) Inventors: Yu-Siang Chen, Minxiong Township (TW); Ching-Chun Liu, Taipei (TW); Ryan Young, Taipei (TW); Ting-Chieh Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 17/482,179

(22) Filed: Sep. 22, 2021

(65) Prior Publication Data

US 2023/0090947 A1 Mar. 23, 2023

(51) Int. Cl.
*G06T 7/73* (2017.01)
*G06N 3/04* (2023.01)
(Continued)

(52) U.S. Cl.
CPC ............. *G06T 7/73* (2017.01); *G06N 3/04* (2013.01); *G06T 7/251* (2017.01); *G06V 40/23* (2022.01);
(Continued)

(58) Field of Classification Search
CPC . G06T 7/73; G06T 7/251; G06T 2207/20081; G06T 2207/30221;
(Continued)

(56) References Cited

U.S. PATENT DOCUMENTS

| 9,744,421 B2 | 8/2017 | Chan |
| 2008/0192116 A1 | 8/2008 | Tamir et al. |

(Continued)

FOREIGN PATENT DOCUMENTS

| CN | 111228799 | * | 6/2020 | ............. A63F 13/52 |
| WO | 2016020947 A1 | | 2/2016 | |
| WO | 2016027947 A1 | | 2/2016 | |

OTHER PUBLICATIONS

Anonymous, "Method and system for camera shooting using moments runbooks," IP.com Prior Art Database, Technical Disclosure No. PCOM000264261D, Nov. 26, 2020, 5 Pages.
(Continued)

*Primary Examiner* — Jerome Grant, II
(74) *Attorney, Agent, or Firm* — Zilka-Kotab, P.C.

(57) ABSTRACT

A computer-implemented method according to one embodiment includes running an initial network on a plurality of images to detect actors pictured therein and body joints of the detected actors. The method further includes running fully-connected networks in parallel, one fully-connected network for each of the detected actors, to reconstruct complete three-dimensional poses of the actors. Sequential model fitting is performed on the plurality of images. The sequential model fitting is based on results of running the initial network and the fully-connected networks. The method further includes determining, based on the sequential model fitting, a locational position for a camera in which the camera has a view of a possible point of collision of two or more of the actors. The camera is instructed to be positioned in the locational position.

20 Claims, 9 Drawing Sheets

(51) Int. Cl.
*G06T 7/246* (2017.01)
*G06V 40/20* (2022.01)

(52) U.S. Cl.
CPC ............. *G06T 2207/20081* (2013.01); *G06T 2207/30221* (2013.01)

(58) Field of Classification Search
CPC ............ G06T 2207/30196; G06N 3/04; G06N 3/045; G06N 3/08; G06V 40/23; G06V 10/82; G06V 20/42; G06V 40/10
USPC ......................................................... 382/103
See application file for complete search history.

(56) References Cited

U.S. PATENT DOCUMENTS

| | | |
|---|---|---|
| 2011/0285809 A1 | 11/2011 | Feng et al. |
| 2020/0074648 A1 | 3/2020 | DeAngelis et al. |
| 2020/0267321 A1 | 8/2020 | Gupta et al. |

OTHER PUBLICATIONS

Dearden et al., "Tracking Football Player Movement From a Single Moving Camera Using Particle Filters," Proceedings of CVMP, Jan. 2006, 9 pages.

Anonymous, "Repeated (twice or more) cognitive prediction to avoid collision of Spidercam with a ball in sports / events like cricket," IP.com Prior Art Database, Technical Disclosure No. IPCOM000252341D, Jan. 5, 2018, 5 pages.

\* cited by examiner

DETERMINATION OF A LOCATIONAL POSITION FOR A CAMERA TO CAPTURE A COLLISION OF TWO OR MORE ACTORS

BACKGROUND

The present invention relates to image processing, and more specifically, this invention relates to determination of collision points between two or more actors and using the same to position an automated camera to capture the collision.

Physical activities have continued to gained popularity over time. For example, sport business has experienced a rate of growth with an average of 4.3% since 2014. Furthermore, the value of sports is now estimated to be worth over five-hundred billion dollars. For context, both participatory and spectator sectors of sports are incorporated into the value of sports. Participatory sectors of sports that contribute to the value of sports include: fitness and recreation centers, community sports, sporting facilities, personal training, etc. Spectator sectors of sports that contribute to the value of sports include: clubs and sports teams, event revenue, media rights, sponsorship and merchandising, etc. The spectator sector of sports is the fastest-growing sector of the two. The revenue generated by media rights had the largest share of this sector in 2018 at 23.7%. Live sports videos are the foundation of media rights income. The process used to capture a scene of sports in live video is an important topic, especially for ball-based sports, e.g., such as basketball, baseball, soccer, etc. Specifically, in order to create the live video of a sports game, multiple cameras are typically utilized to shoot each scene of the live video from different angles. The cameras are operated by a plurality of camera operators, who are each responsible for capturing a unique angle of the sports game. Program directors are responsible for deciding, e.g., based on their own experience, when to switch between the different camera angles and the timing that each camera angle is allotted on an output video stream.

SUMMARY

A computer-implemented method according to one embodiment includes running an initial network on a plurality of images to detect actors pictured therein and body joints of the detected actors. The method further includes running fully-connected networks in parallel, one fully-connected network for each of the detected actors, to reconstruct complete three-dimensional poses of the actors. Sequential model fitting is performed on the plurality of images. The sequential model fitting is based on results of running the initial network and the fully-connected networks. The method further includes determining, based on the sequential model fitting, a locational position for a camera in which the camera has a view of a possible point of collision of two or more of the actors. The camera is instructed to be positioned in the locational position.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining a locational position for a camera to capture a collision of two or more actors.

In one general embodiment, a computer-implemented method includes running an initial network on a plurality of images to detect actors pictured therein and body joints of the detected actors. The method further includes running fully-connected networks in parallel, one fully-connected network for each of the detected actors, to reconstruct complete three-dimensional poses of the actors. Sequential model fitting is performed on the plurality of images. The sequential model fitting is based on results of running the initial network and the fully-connected networks. The method further includes determining, based on the sequential model fitting, a locational position for a camera in which the camera has a view of a possible point of collision of two or more of the actors. The camera is instructed to be positioned in the locational position.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
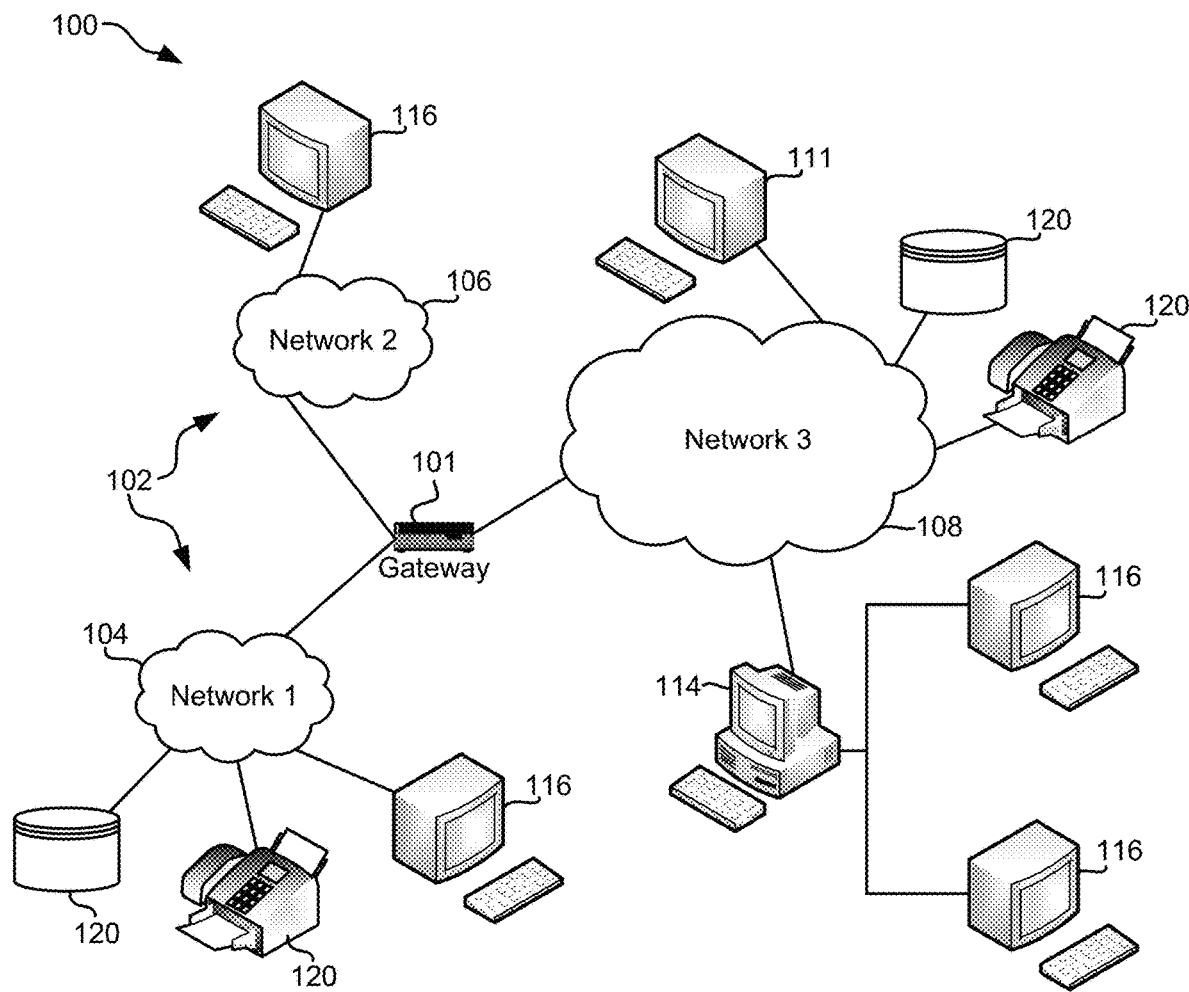
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
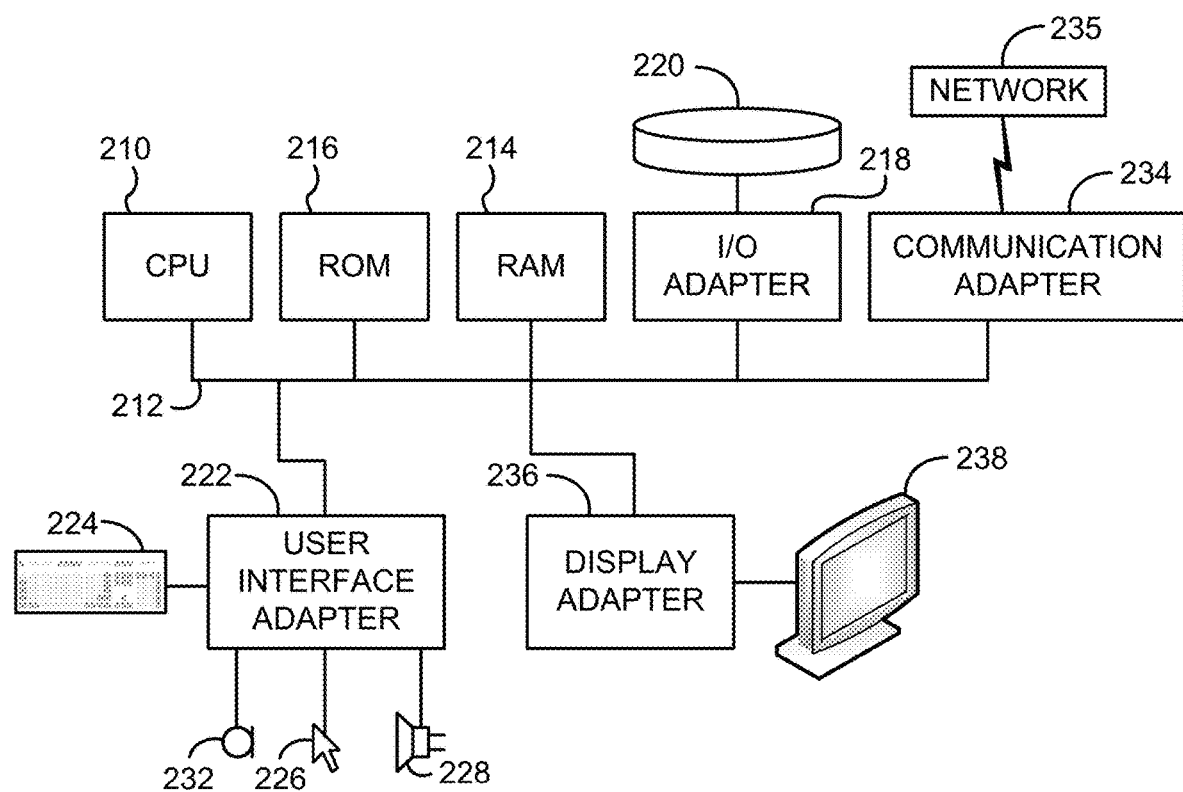
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
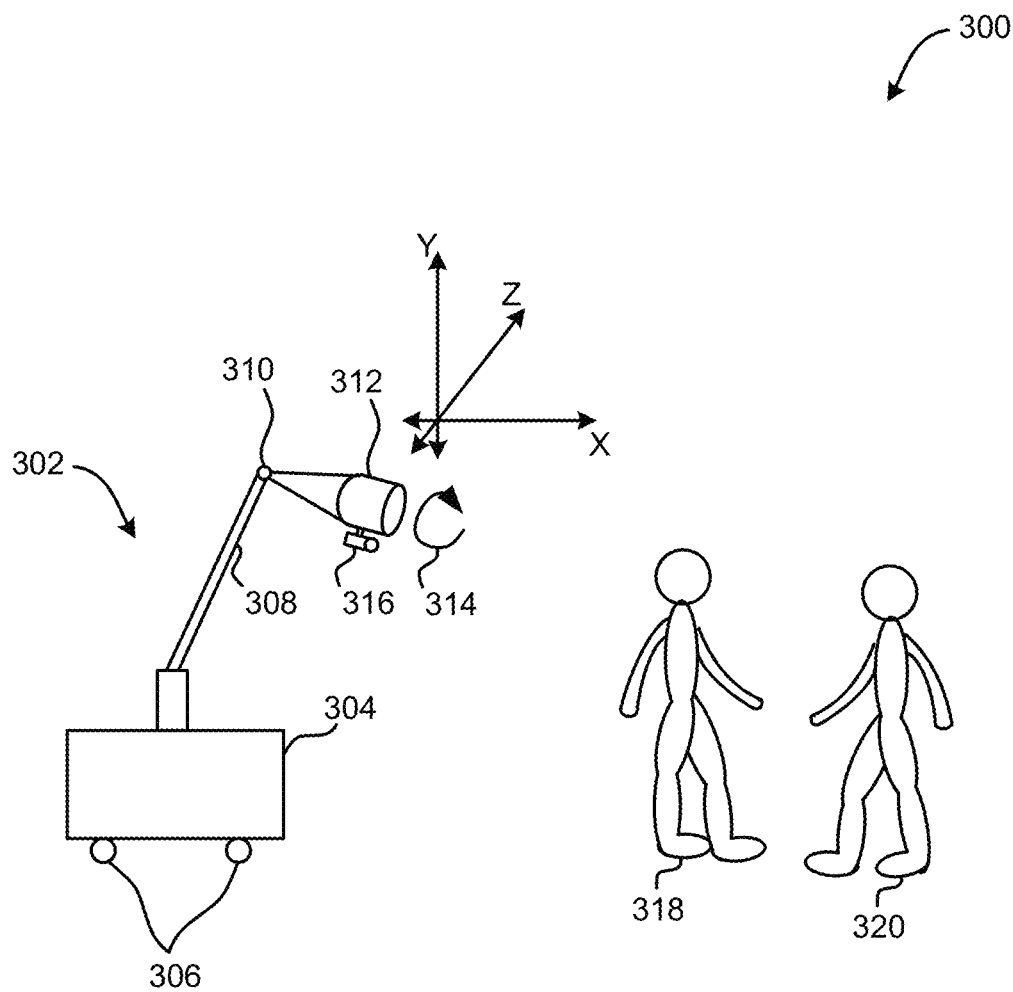
FIG. 3 is a representative hardware environment, in accordance with one embodiment.

Now referring to FIG. 3, a representative hardware environment 300 is shown according to one embodiment. As an option, the representative hardware environment 300 may be implemented in conjunction with features from any other embodiment listed herein, such as those described with reference to the other FIGS. Of course, however, such representative hardware environment 300 and others presented herein may be used in various applications and/or in permutations which may or may not be specifically described in the illustrative embodiments listed herein. Further, the representative hardware environment 300 presented herein may be used in any desired environment.

The representative hardware environment 300 includes an automated camera 302. The automated camera 302 is configured to be positioned in any locational position, e.g., see X, Y, Z. For example, the automated camera 302 includes a base 304 that includes wheels 306, although in some other approaches the automated camera 302 may additionally and/or alternatively be connected to and able to be positioned using an automated cable system. Furthermore, the automated camera 302 includes an arm 308 that extends from the base 304, and a pivot joint 310 that enables a lens 312 of the automated camera 302 to be pivotably adjusted and/or rotatably adjusted, e.g., see rotational direction 314. A light emitter 316 may also be optionally coupled to the lens 312 of the automated camera 302. As will be described in greater detail elsewhere below, a locational position for the automated camera 302 may be determined in which the automated camera 302 has a view of a possible point of collision of two or more actors, e.g., see actors 318, 320, and the automated camera 302 may be instructed to be positioned in the determined locational position.

As mentioned elsewhere herein, physical activities have continued to gained popularity over time. The process used to capture a scene of sports in live video is an important topic, especially for ball-based sports, e.g., such as basketball, baseball, soccer, etc. Specifically, in order to create the live video of a sports game, multiple cameras are typically utilized to shoot each scene of the live video from different angles. The multiple cameras are operated by a plurality of camera operators, who are each responsible for capturing different angles of the sports game. Program directors are responsible for deciding, e.g., based on their own experience, when to switch between the different camera angles and the timing that each camera angle is allotted on an output video stream.

Program directors are responsible for switching between the different camera angles in an attempt to provide consumers of the output video stream with preferred views of the sporting event. "Preferred" views of the sporting event may depend on consumer preferences. However, a majority of consumers that view video streams of sporting events prefer for collisions between two actors, e.g., athletes, in a sporting event to be fully captured by cameras and incorporated into the output video stream that they view. Camera operators have no way to know when preferred views such as collisions will occur, other than the camera operator's experience. Moreover, because the consumers also call for the content of the video stream to be played as closely as possible to the actual sporting event, e.g., with minimal time delays incorporated in the video stream, the program director's decisions of when to switch between the different camera angles and the timing that each camera angle is allotted on the output video stream are made in close to real time, e.g., a "live" broadcast. As a result, preferred views, such as collisions, of sporting events are often not captured by camera operators and/or not successfully included in the output video stream by a program director.

In sharp contrast to the deficiencies described above, various embodiments and approaches described herein propose techniques for ensuring that contact between a plurality of actors, e.g., such as athletes playing a sport, is captured in images taken by a camera and thereafter incorporated into a video stream. Specifically, various embodiments and approaches described herein propose artificial intelligence-based (AI-based) techniques to track the actions of actors engaging in activities, during which at least some of the actors are likely to come into contact with one another. This technique is especially useful in high activity sports e.g., such as ball based sports such as football, basketball, soccer, etc. In subsequent stages, these techniques are further configured to estimate three-dimensional localizations and instruct a scene to be captured using an automatic camera. These three-dimensional localizations include, e.g., position (s) and relative pose(s) of the actors, expected three-dimensional collision points among the different actors, a candidate next locational position for a camera at which the camera is able to capture three-dimensional collision points of the actors for clear viewing by an audience viewing an output video stream, etc. As described above, because program directors and camera operators have proven to be incapable of ensuring that all collisions and preferred angles of a scene such as a sporting event are captured by a camera and incorporated into a video stream that is output proximate in time to when events of the scene actually occur, various embodiments and approaches described herein enable a "smart" camera view in that at least one camera is automatically able to capture collisions and preferred angles of a scene for incorporating into a video stream. As will be described in further detail elsewhere herein, various embodiments and approaches described herein are also configured to anticipate collision locations among actors, e.g., such as ball players. Specifically, for images that are captured during the sport events by an automatic camera, a locational position of the camera is determined based on a probability of a collision location. Automated cameras are instructed, e.g., via a pose adjustment instruction, to be positioned in the locational position in order to take a plurality of images that include a relatively large degree of information, e.g., such as detailed views of collisions between two athletes, for viewing by fans and/or referees. By ongoingly leveraging these techniques for the duration of an event such as an athletic event, a detailed video steam of the event is able to be produced and output without errors and moreover without human intervention.

Figure 4:
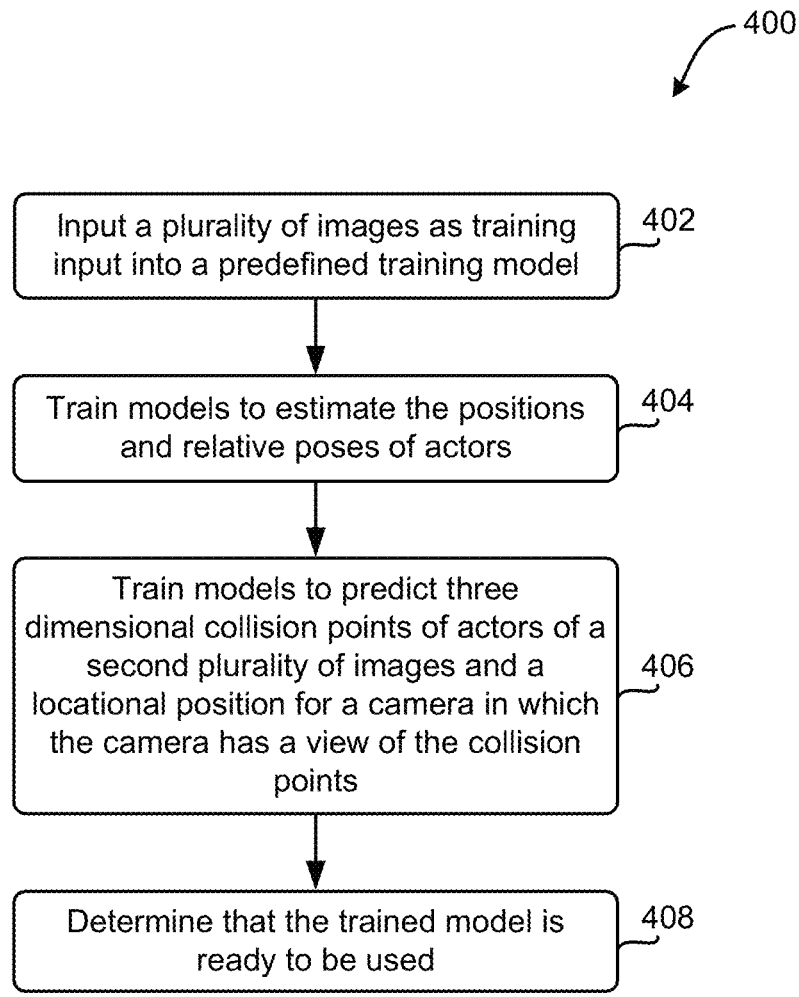
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-6D, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 400 includes techniques for training a model that may be applied, e.g., by instructing an automated camera and processing a video stream for outputting, in one or more embodiments described elsewhere herein, e.g., see method 500. In other words, in some approaches, previously recorded video streams may be processed in order to serve as a reference with respect to, e.g., what collisions between actors look like, poses of actors before collisions occur, positional locations of cameras that successfully captured collision events between actors, etc.

It should be further prefaced that although various embodiments and approaches described herein use the term "actors" to refer to humans shown in one or more images, in some preferred approaches, the actors are humans. More specifically, the actors may be athletes participating in a sport in which a collision is expected to occur between two or more of the athletes participating therein, e.g., football, basketball, soccer, wrestling, boxing, water polo, lacrosse, rugby, etc. Furthermore, the actors may additionally and/or alternatively be athletes participating in a ball-based sports, e.g., such as basketball, baseball, soccer, etc.

Operation 402 of method 400 includes inputting a plurality of images as training input into predefined training model(s). In some approaches, the plurality of images are predetermined to include preferred content. According to one preferred approach, the preferred content depicts a collision between two or more actors and at least some images of the actors leading up to and/or following a point of collision between the actors. Accordingly, a plurality of images that includes the preferred content includes information about a camera that captured the preferred content, e.g., such as a locational position of the camera while the preferred content was being captured by the camera, an amount of time that the camera was in the locational position relative to a speed of the actors before the collision, a frame speed of the camera, a degree of zoom of the camera, etc.

The plurality of images may be obtained from past recordings of sporting events. However, because past recordings of sporting events may include content that is not preferred, e.g., such as content that depicts a sporting event field with but does not include a collision between two or more actors, in some approaches, the plurality of images may be obtained from historical sports videos such as "highlight reels" of sports and/or news organizations that depict collisions between two or more actors.

The training models are trained to estimate the positions and relative poses of actors, e.g., see operation 404 of method 400. In some approaches, known types of human recognition algorithms may be used to identify actors in the plurality of images. With the actors identified, positions and relative poses of the actors may also be identified in the plurality of images, e.g., an actor leaning over, an actor falling down, an actor sitting down and not moving toward another of the actors, an actor diving toward another of the actors, etc. Moreover, positions of the actors may include relative distances of the actors from one another in each of the images. The positions of the actors with respect to a predetermined area of a sporting field, e.g., near a basket or goal, in an offensive area of the field, in a defensive area of the field, etc., that the actors are on, may additionally and/or alternatively be determined. Positions of the actors with respect to one or more predetermined areas of the sporting field may be determined because some areas of a sporting field may be more likely to have collisions between players, e.g., such as under a basket of a basketball court where basketball players typically collide with one another while attempting to rebound a basketball. According to some other examples, positions and relative poses of the actors that may be considered, for the training, to be likely to result in a collision with another actor includes, e.g., two or more actors that in a predetermined number of successive images continue to approach one another such that they are on an expected collision path, two or more actors that are leaning in directions that converge, two or more actors that are looking towards one another, two or more actors having motion vectors that converge, etc.

In operation 406 of method 400, the training models are trained to predict three dimensional collision points of actors, e.g., of a second plurality of images, and a locational position for a camera in which the camera has a view of the collision points of the actors. In some approaches, this training may include generating tables and/or lists of the positions and relative poses of actors of the plurality of images input as the training input. In some approaches, these positions and relative poses of actors may be two dimensional based, while in some other approaches, they may be three dimensional based. This way, the trained model may be used, e.g., on a second plurality of images, such that actors of the second plurality of images that are determined to have similar positions and relative poses, e.g., within a predetermined degree of similarity, as the actors of the plurality of images input as the training input, may be determined to likely collide thereafter with another of the actors of the second plurality of images. In some approaches, a known type of algorithm for comparing data of two or more different samples of images may be modified to use the generated tables and/or lists to make such a determination. Similarly, this training may include generating tables and/or lists of the locational positions that camera(s) were positioned in in order to record the plurality of images input as training input. Moreover, in some approaches, the location positions of the camera may be associated with positions and relative poses of actors of the tables and/or lists. For example, the locational position of a camera that captured a plurality of positions and relative poses of actors that thereafter collided with one another may be associated with the plurality of positions and relative poses in the generating tables and/or lists.

The trained model is ready to be used once it is determined that the training models have completed training, e.g., see operation 408 of method 400. In some approaches, it may be determined that the training models have completed training in response to a determination that, e.g., the tables and/or lists have been generated, the training model is successfully able to identify at least two actors that are likely to collide from predetermined testing images that include collisions, etc. The trained model may in some approaches serve as a reference when determining a locational position for a camera in which the camera has a view of a possible point of collision of two or more actors of a plurality of images. More specifically, in response to a determination that a plurality of images include actors that are expected to collide with one another, e.g., see various techniques for making such a determination in method 500, information of the trained model may be used to determine a locational position of a camera to capture the collision.

Figure 5:
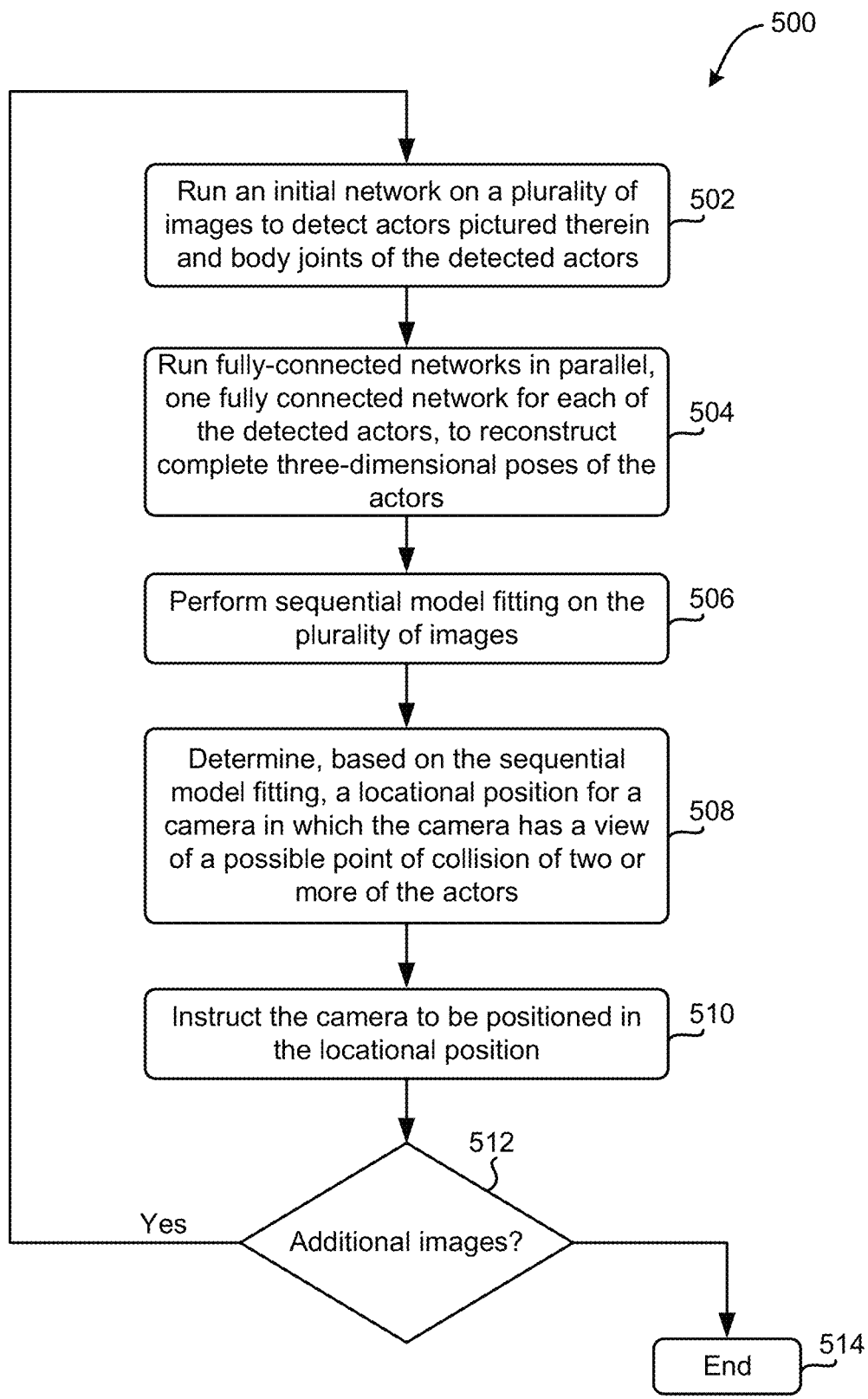
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-6D, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Operation 502 of method 500 includes running an initial network on a plurality of images to detect actors pictured therein and body joints of the detected actors. The plurality of images may be any type of images that include one or more actors. In some preferred approaches, the actors are human beings, although in some other approaches, the actors may be a type of animal and/or any object used in a sporting event such as a ball. Moreover, the plurality of images preferably capture the actors while participating in an activity, e.g., such as a sports event, in which there is the potential for actors to collide with something, e.g., two or more actors to collide with one another, an actor to collide with an object, an actor to collide with a ball in a ball-based sport, etc.

The initial network may be any suitable processing network known in the art. In one preferred approach, the initial network is a core network, e.g., such as a convolutional neural network (CNN), that is configured to utilize the trained models of method 400 to perform influential operations using the plurality of images. Accordingly, one or more operations used to run the initial network may utilize the training and determinations established in method 400. With continued reference to operation 502 of method 500, in other approaches other known type of AI-based network models may additionally and/or alternatively be incorporated to mathematically predict and/or identify predetermined aspects within the plurality of images.

In some preferred approaches the CNN is configured to, in a first stage of processing, process each image of the plurality of images using a predetermined plurality of two-dimensional kernels of a two-dimensional based branch of the network. At least some of the two-dimensional kernels may be applied to determine body joints of the detected actors, e.g., occluded joints, in order to determine a per-frame/image root-relative pose estimate for one or more of the actors. In some approaches, a heatmap of joints that occur at each pixel throughout a plurality of images may be referenced to determine the body joints of the detected actors. The plurality of two-dimensional kernels may include one or more of, e.g., a one-by-one convolutional parameter, a plurality of two-by-two convolutional parameters, and a four-by-four deconvolutional parameter. Note that each of the parameters may include a predetermined number of filters therein, and therefore in some approaches, adjustments may be made to change which parameter and/or filters are applied based on whether or not results are obtained as a result of running the two-dimensional kernel of the CNN. Results that are preferably obtained as a result of running the two-dimensional kernel of the CNN may include, e.g., an identified number of actors that are in the plurality if images, a number of strides determined from the filtering, a two-dimensional based identification of the body joints of each of the detected actors, etc., which may be used in later stages of processing described herein such as operations 504-506 of method 500. In some approaches, a predetermined constant may be applied to the results prior to the results being used in processing of later stages. For example, in one approach, a predetermined equation that may be utilized to apply the predetermined constant to the results of the stage one processing may include:

$$\{P^{2D}_k\}^K_{k=1}, c \qquad \text{Equation (1)}$$

where: "P" represents the result of a given one of the actors that is being considered, "2D" represents that two-dimensional processing is being considered, "K" represents the identified number of actors that are in the plurality if images, k=1 indicates a first of the actors, and c is value from one to one-hundred that represents a determined level of confidence that is based on an amount of data that is determined for a given one of the actors. For example, a relatively lower level of confidence c may be assigned to first of the actors in response to a relatively small amount of data being determined for the first of the actors during the two-dimensional processing of the plurality of images. In contrast, a relatively greater level of confidence c is assigned to a second of the actors in response to a relatively greater amount of data being determined for the second of the actors during the two-dimensional processing of the plurality of images. The two-dimensional based branch of the CNN may additionally and/or alternatively be configured to apply a predetermined number of convolutional parameters on the plurality of images to generate two-dimensional pose encoding on visible body joints of the actors of the plurality of images.

In some preferred approaches the CNN is additionally and/or alternatively configured to, in a first stage of processing, process each image of the plurality of images using a predetermined plurality of three-dimensional kernels of a three-dimensional based branch of the network. Based on the application of the three-dimensional kernels, body joints of the detected actors may be detected and/or further defined in order to determine a per-frame/image root-relative pose estimate for one or more of the actors. The plurality of three-dimensional kernels may include one or more of, e.g., a plurality of one-by-one convolutional parameters, a plurality of two-by-two convolutional parameters, and a four-by-four deconvolutional parameter. Note that each of the parameters may include a predetermined number of filters therein, and therefore in some approaches, adjustments may be made to change which parameter and/or filters are applied based on whether or not results are obtained as a result of running the three-dimensional kernel of the CNN. Moreover, in some approaches, method 500 may include concatenating the outputs of a predetermined number of convolutional parameters of the two-dimensional kernels with a predetermined number of outputs of a predetermined number of convolutional parameters of the three-dimensional kernels. The outputs of the concatenating may be subjected to even further filtering by the convolutional parameters of the three-dimensional kernels in some approaches. Results obtained from running the three-dimensional kernel of the CNN may include, e.g., an identified number of actors that are in the plurality if images, a three-dimensional based identification of the body joints of each of the detected actors, a number of strides of each image, one or more predetermined other parameter(s), etc., which may be used in later stages of processing described herein, e.g., see operations 504-506 of method 500. The results may additionally and/or alternatively include a determined number of layers that exist in the plurality of images, e.g., L. The three-dimensional based branch of the CNN may additionally and/or alternatively be configured to apply a predetermined number of convolutional parameters on the plurality of images to generate three-dimensional pose encoding on visible body joints of the actors of the plurality of images.

In a second stage of processing, one fully-connected network is run in parallel for each of the detected actors to reconstruct complete three-dimensional poses of the actors, e.g., see operation 504 of method 500. The fully-connected network may be a fully-connected network of any type known in the art. Each of the reconstructed complete three-dimensional poses of the actors preferably include the body joints of the detected actors. The complete three-dimensional poses of the actors may in some approaches be reconstructed by incorporating pose encoding evidence such as the two-dimensional results, e.g., the generated two-dimensional pose encoding on visible body joints of the actors of the plurality of images, and/or the three-dimensional results, e.g., such as the generated three-dimensional pose encoding on visible body joints of the actors of the plurality of images, over all visible joints of the actors and a three-dimensional pose structure of the training model of method 400. At least some encoding conflicts may be identified as a result of incorporating the pose encoding evidence determined in stage one of method 500 over three-dimensional pose structures of the training model of method 400. For example, these encoding conflicts may include, e.g., an occulated joint detected in the first stage being incorrectly associated with one of the actors of the plurality of images, more than a predetermined number of occulated joints being detected in the first stage, etc. The encoding conflicts may in some approaches be identified by performing reasoning about occluded joints, e.g., using a known type of comparative technique to compare poses of the actors identified in the plurality of images to poses of actors identified training input used in a predefined training model. In such an approach, where poses of the actors identified in the plurality of images are similar, e.g., within a predetermined degree of similarity, to poses of actors identified training input used in a predefined training model, it may be determined whether any of the occluded joints of the actors identified in the plurality of images are outliers. Any outlier occluded joints may be omitted from consideration in some approaches. In some other approaches, a determination that outlier occluded joints exist in the results of the two-dimensional and/or three-dimensional processing may trigger further stage one processing (additional degrees of filtering) and/or stage one processing to be reperformed on the plurality of images.

Sequential model fitting is performed on the plurality of images, e.g., see operation 506 of method 500. The sequential model fitting is preferably performed in a third stage of processing and is based on results of running the initial network and the fully-connected networks, e.g., the sequential model fitting may specifically be performed on the results of the stage one and/or results of the stage two processing. In some approaches, performing sequential model fitting on the plurality of images includes using kinematic skeleton fitting to obtain temporally coherent motion capture results. In some approaches known techniques of kinematic fitting may be utilized using the results of the stage one and/or results of the stage two processing. According to one or more approaches, the temporally coherent motion capture results may include, e.g., localizations of the actors relative to the camera, a joint angle parameterization of the actors relative to one or more predetermined cameras, a possible point of collision of two or more of the actors, etc. In some approaches, the possible point of collision of two or more of the actors may be an intersection of directional vectors of two or more of the actors that are expected to collide. The training model may be, at least in part, used to predict that the two or more actors are likely to collide, e.g., based on the actors having motion capture results and/or poses that are similar to those of actors evaluated during training of the training model. Outputs of the third stage of processing preferably include three-dimensional poses of the actors and possible points of collision of two or more of the actors.

A locational position for a camera in which the camera has a view of a possible point of collision of two or more of the actors with each other is determined, e.g., see operation 508. The locational position of the camera is in some preferred approaches, determined based on the sequential model fitting. For example, the locational position of the camera preferably provides the camera with a view of a possible point of collision of two or more of the actors. The locational position for the camera in which the camera has a view of the possible point of collision of two or more of the actors may additionally and/or alternatively be determined by applying the coherent motion capture results into a predetermined regression network, which may be of a known type. Furthermore, the coherent motion capture results may additionally and/or alternatively be applied to known types of multi-dimensional scaling such that a two-dimensional possible point of collision may be scaled to a three-dimensional possible point of collision.

The determination of the locational position for the camera may additionally and/or alternatively be based on the training model because the locational position of a camera in the training model previously allowed for a camera to capture collisions of actors in the plurality of images used as training input. In some approaches, a plurality of angular locational positions, e.g., a ground up perspective, a side perspective, a top down perspective, etc., of a plurality of cameras that capture the same collision between a plurality of actors may be identified in the plurality of images used as training input. Where multiple cameras are available during the processing of the plurality of images, unique locational positions for the cameras may be determined for each of the available cameras. In some approaches, a priority may be established for the plurality of angular locational positions. For example, the angular locational positions may be prioritized based on a number of times that each of the angular locational positions are detected during processing of the plurality of images used as training input. For example, more frequently detected angular locational positions are assigned a relatively higher priority than less frequently detected angular locational positions. This priority may then be applied when determining angular locational positions for available cameras.

It should be noted that the locational position of the camera preferably does not zoom the view of the camera to a degree that prevents a predetermined amount of the actor's bodies from being captured in the camera view. Note that the predetermined amount of the actor's bodies that is to be captured in the camera view may be determined during the training of the training models, e.g., relatively similar to a determined degree of zoom of the plurality of images input as training input into the predetermined training model.

The camera is instructed to be positioned in the locational position, e.g., see operation 510. This instruction is preferably made within a predetermined amount of time before the possible point of collision of the two or more actors with each other is predicted to occur. In some approaches, the collision between two or more of the actors may be expected to occur in a greater amount of time than the predetermined amount of time. In this case, the instruction for the camera to be positioned in the locational position may be output after a delay, e.g., a difference between the times. In some approaches, it may be determined that the predicted collision did not occur. In one or more of such approaches, provided that more than one automated camera is available, at least one of the cameras may stay in the locational position for a predetermined amount of time in response to a determination that two or more of the actors are still within the scene. In response to a determination that two or more of the actors are not still within the scene, the camera may be used for another instruction.

As mentioned elsewhere herein, in some preferred approaches, the plurality of images depict a sporting event where the actors are athletes participating in the sporting event. Accordingly, because collision events may continue to occur throughout the duration of the sporting event, the plurality of images may be associated with a relatively short amount of gameplay, e.g., seconds or portions thereof. This way, the cameras may be adjusted to determined locational positions before predicted collisions between actors of the plurality of images actually occur. As a result of ongoingly performing the techniques of method 500, a live video of the sporting event may be produced in close to real time, e.g., a "live" broadcast. Accordingly, decision 512 of method 500 includes determining whether additional images are available for processing, e.g., whether cameras have captured additional game play of the sporting event. In response to a determination that additional images are available for processing (e.g., as illustrated by the "Yes" logical path of decision 512) method 500 optionally continues to operation 502. In response to a determination that additional images are not available for processing (e.g., as illustrated by the "No" logical path of decision 512) method 500 optionally ends, e.g., see operation 514.

Various benefits are enabled as a result of implementing the techniques of various embodiments and approaches described herein. For example, various embodiments and approaches described herein propose techniques for ensuring that contact between a plurality of actors, e.g., such as athletes playing a sport, is captured in images taken by a camera and thereafter incorporated into a video stream without errors and without human intervention. This results in a relatively more enjoyable viewing stream as preferred content, that likely otherwise not be incorporated into an output viewing stream without utilizing the techniques of various embodiments and approaches described herein, is available to a viewing consumer. Furthermore, a real-time system and method for capturing three-dimensional motion of ball players and the possible collision points among them is enabled. Camera pose estimation is also enabled to be performed to capture the possible collision scene or a better view for audience by using two-dimensional video streaming only. The output video of collisions of actors therein are useful for a plurality of viewers, e.g., referees to capture critical sports moments in live sports that may be used to judge a sporting competition more accurately, medical professionals that are evaluating the collisions, an audience that is streaming the output video stream for enjoyment, etc.

FIGS. 6A-6D depict various stages 600, 630, 660, 690 of processing one or more images, in accordance with several embodiments. As an option, the present stages 600, 630, 660, 690 of processing may be implemented in conjunction with features from any other embodiment listed herein, such as those described with reference to the other FIGS. Of course, however, such stages 600, 630, 660, 690 of processing and others presented herein may be used in various applications and/or in permutations which may or may not be specifically described in the illustrative embodiments listed herein. Further, the stages 600, 630, 660, 690 of processing presented herein may be used in any desired environment.

It may be prefaced that in some preferred approaches, an input to the various stages 600, 630, 660, 690 of processing includes a live stream of monocular color frames showing a multi-actor scene with four subsequent stages of processing being performed thereon. For example, the first and second stages 600, 630 may be implemented to predict per-frame root-relative pose estimates for each actor. The third stage 660 may be utilized to output three-dimensional poses of actors and the possible collision point among different actors in real time. Finally, the fourth stage 690 may be implemented to determine a three-dimensional locational position for a camera, e.g., to move to and be adjust in such that the camera is enabled to capture preferred content such as a predicted collision between two or more of the actors. Note that although the processing described in FIGS. 6A-6D may be performed on a single image in some approaches such that the locational position for the camera may be determined by processing only a single image, e.g., see image 602, in some other approaches a plurality of images are preferably processed using techniques similar to those described elsewhere above in order to determine locational positions for the camera throughout an event, e.g., a sporting event.

Figure 6A:
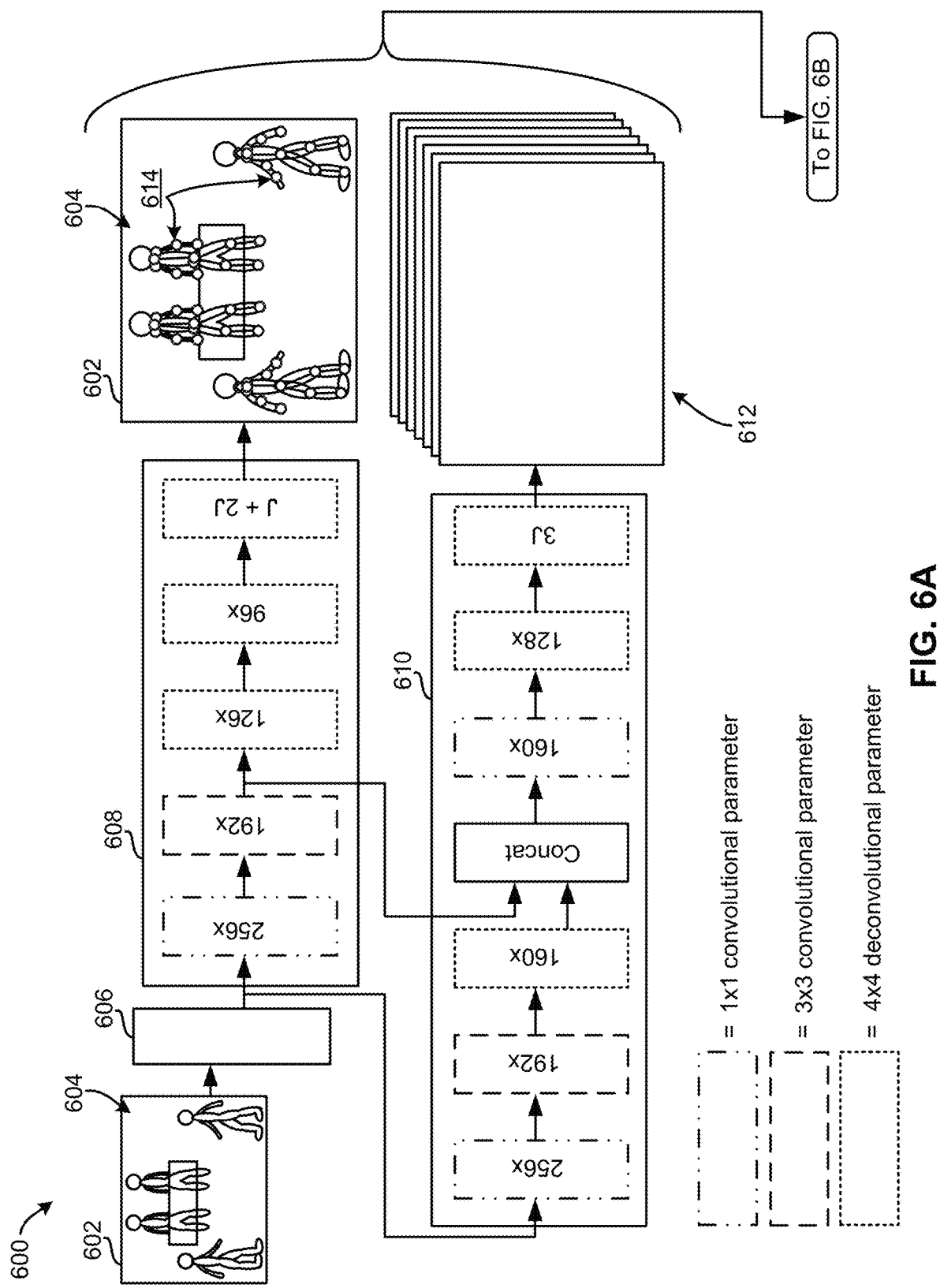
FIG. 6A is a first stage of processing one or more images, in accordance with one embodiment.

Referring now to FIG. 6A, the first stage 600 of processing is performed on the image 602 having a plurality of actors 604 therein. An initial network is run on at least the image 602 to detect actors pictured therein and body joints of the detected actors, e.g., see joints 614. In one preferred approach, the initial network is a core network, e.g., see core network 606, which may be a CNN. The CNN may be configured to utilize the trained models of method 400 to perform influential operations using the image 602. Furthermore, the first stage 600 may use CNN as an initial network and processing may be split into two separate branches for two-dimensional pose prediction, e.g., see two-dimensional branch 608, and three-dimensional pose encoding, e.g., see three-dimensional branch 610, on the visible body joints 614.

In some approaches, the CNN is additionally and/or alternatively configured to, in the first stage 600 of processing, process the image using a predetermined plurality of three-dimensional kernels of the three-dimensional based branch 610. For example, the three-dimensional kernels include convolutional parameters that each have a number of filters specified therein, e.g., see 256x, in addition to predetermined hyperparameters, e.g., see 3J. Similarly, the two-dimensional kernels include convolutional parameters that each have a number of filters specified therein, e.g., see 256x, in addition to predetermined hyperparameters, e.g., see J+2J. In some approaches, the outputs of a predetermined number of convolutional parameters of the two-dimensional kernels may be concatenated with a predetermined number of outputs of a predetermined number of convolutional parameters of the three-dimensional kernels, e.g., see Concat. The outputs of the concatenating may be subjected to even further filtering by the convolutional parameters of the three-dimensional kernels in some approaches. Results obtained from running the three-dimensional kernel of the CNN may include, e.g., an identified number of actors that are in the plurality if images, a three-dimensional based identification of the body joints 614 of each of the detected actors, a number of strides of each image, etc., which may be used in later stages of processing described herein, e.g., see stages 630, 660 and 690. Moreover, the results may additionally and/or alternatively include a determined number of layers that exist in the one or more images, e.g., 612. The three-dimensional branch 610 may additionally and/or alternatively be configured to apply a predetermined number of convolutional parameters on an image to generate three-dimensional pose encoding on visible body joints 614 of the actors of the image.

Figure 6B:
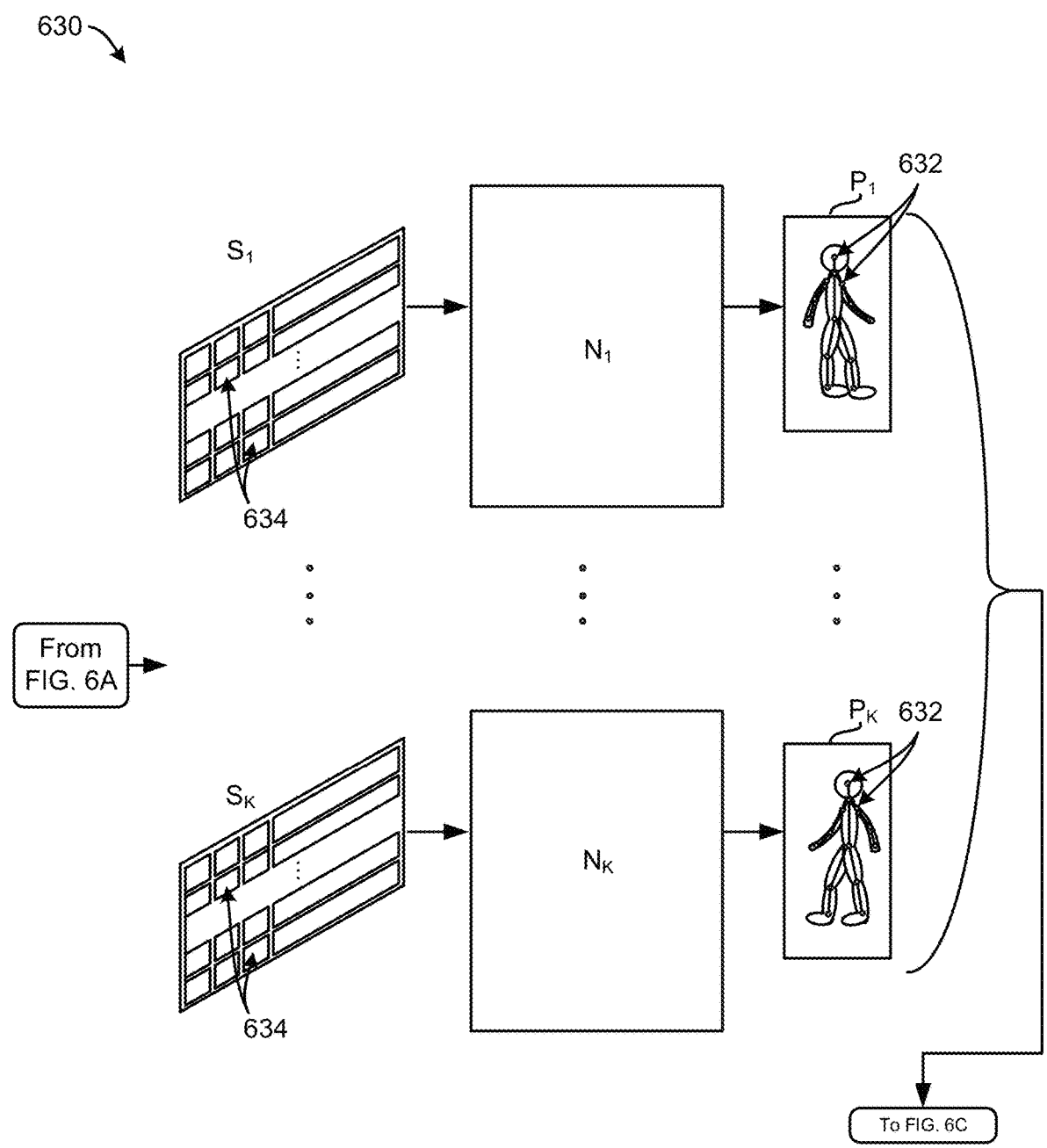
FIG. 6B is a second stage of processing one or more images, in accordance with one embodiment.

In FIG. 6B, the second stage 630 of processing includes a fully-connected network, e.g., see $N_1$-$N_K$, being run in parallel for each of the detected actors, e.g., see $S_1$-$S_K$, to reconstruct complete three-dimensional poses, e.g., see $P_1$-$P_K$, of the actors. In the image 602 there are four actors and therefore the variable K is four in the current example. Points, e.g., joints or a point identifying a contour of the actors, of the actors identified in the first stage 600 of processing may be converted to vectors 634 using a known type of image point to vector conversion technique for three-dimensional pose reconstruction in the second stage 630. Each of the reconstructed complete three-dimensional poses of the actors preferably include the body joints 632 of the detected actors. The complete three-dimensional poses of the actors may in some approaches be reconstructed by incorporating pose encoding evidence such as the two-dimensional results and/or the three-dimensional results, e.g., see the logical output of the first stage 600 continue to the logical input of the second stage 630.

Figure 6C:
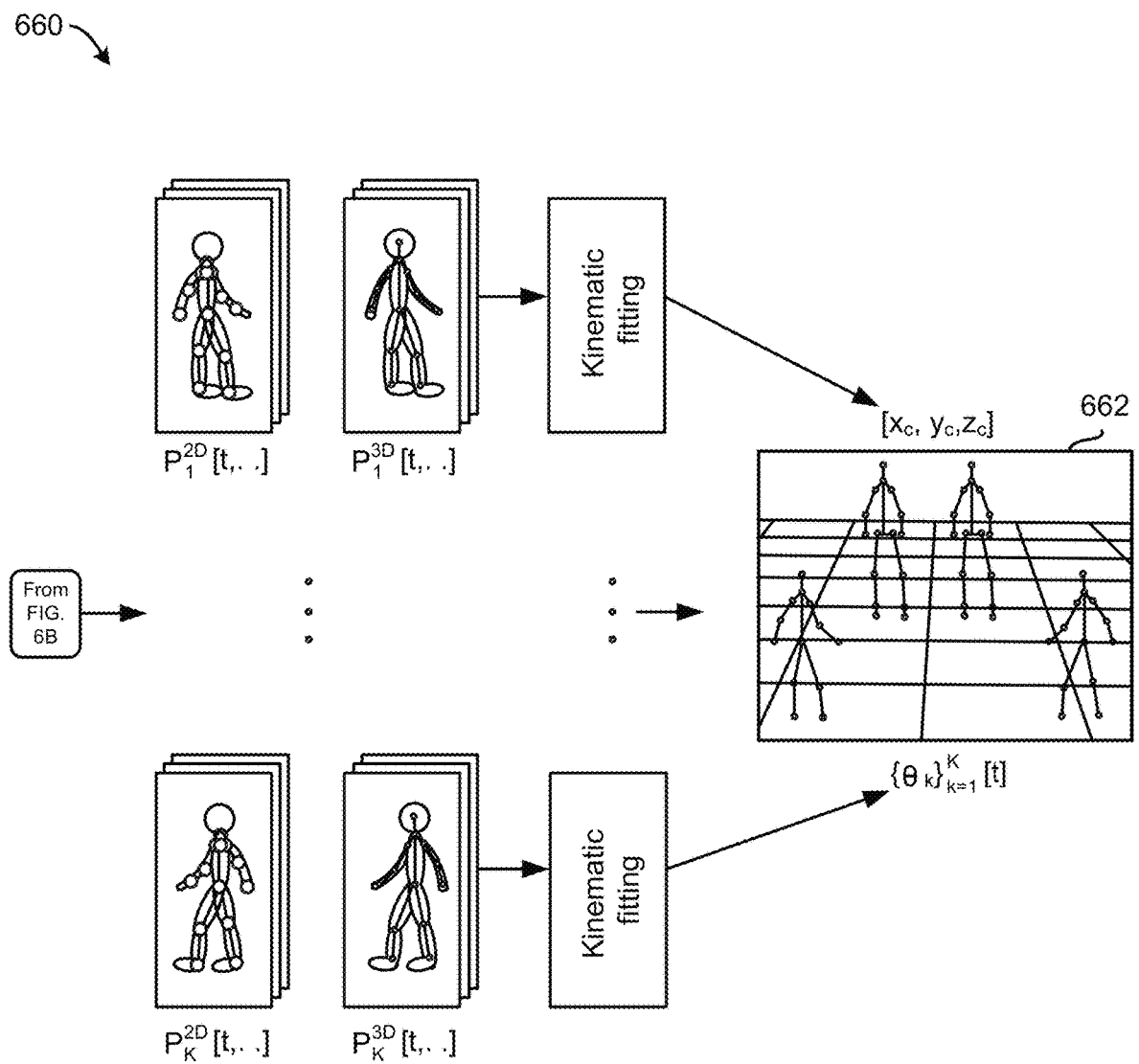
FIG. 6C is a third stage of processing one or more images, in accordance with one embodiment.
Figure 6D:
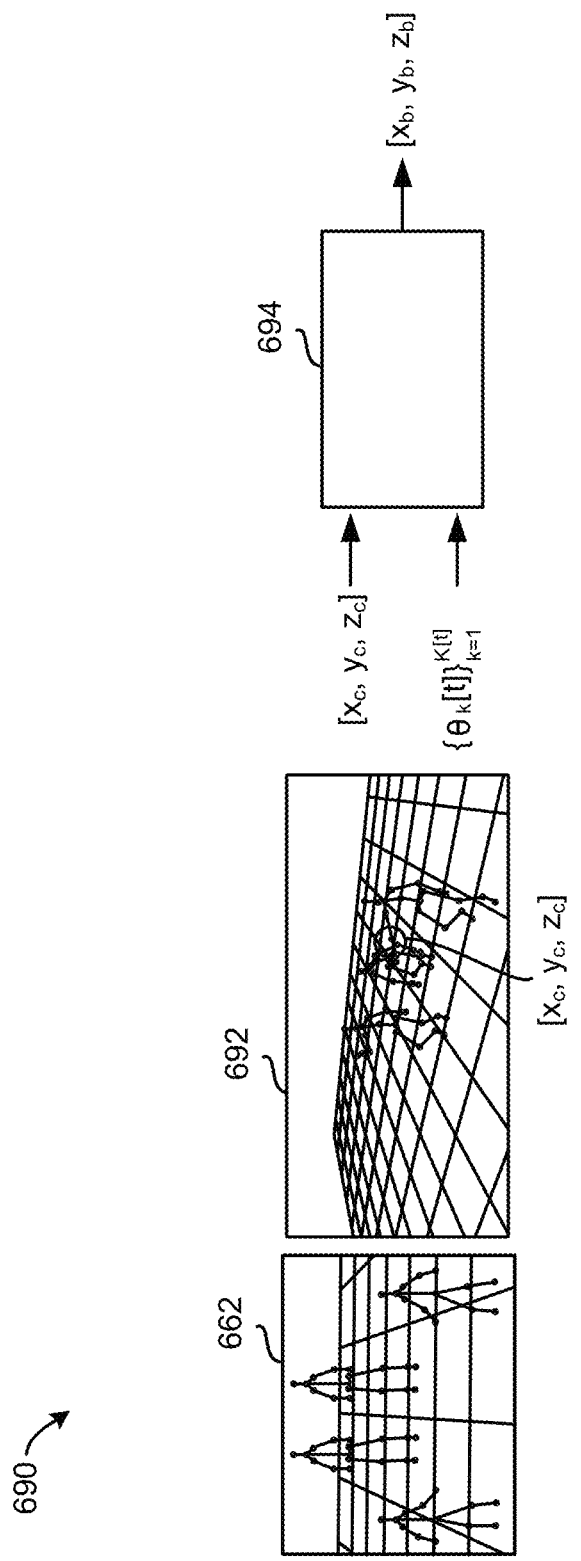
FIG. 6D is a fourth stage of processing one or more images, in accordance with one embodiment.

Now referring to FIG. 6C, in the third stage 660 of processing, sequential model fitting is performed on the live stream, e.g., with respect to time (t) over a plurality of images processed, of two-dimensional predictions, e.g., see $P^{2D}_1[t, \ldots]\text{-}P^{2D}_K[t, \ldots]$, and three-dimensional predictions, e.g., see $P^{3D}_1[t, \ldots]\text{-}P^{3D}_K[t, \ldots]$, from the first and second stages 600, 630 of processing. For example, by inputting the predictions into kinematic predetermined skeleton fitting models, e.g., see Kinematic fitting, temporally coherent motion capture results 662 may be obtained. In one approach, the temporally coherent motion capture results 662 include localizations of the actors relative to the camera, e.g., see skeletal pose $\{\Theta_k\}^{K(t)}_{K=1}[t]$, where K(t) represents actors in the scene (the scene in the image), K=1 represents a first of the actors, t represents time, and $\Theta_k$ represents a joint angle parameterization of the actors which may include the number of degrees of freedom for one skeleton. In another approach, the temporally coherent motion capture results 662 additionally and/or alternatively include a possible point of collision of the actors, e.g., see $[x_c, y_c, z_c]$, which may be two-dimensional or preferably three-dimensional, e.g., see the possible point of collision of the actors identified in a three-dimensional temporally coherent motion capture results 692 in FIG. 6D.

In the fourth stage 690 of processing, outputs of the third stage 660 of processing are utilized to determine a locational position $[x_b, y_b, z_b]$ for a camera in which the camera has a better view of a possible point of collision of two or more of the actors with each other. In one approach, the locational position $[x_b, y_b, z_b]$ for the camera may be determined by applying the coherent motion capture results of the third stage 660 into a predetermined regression network 694. A camera may be instructed to be positioned in the locational position.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
running an initial network on a plurality of images to detect actors pictured therein and body joints of the detected actors;
running fully-connected networks in parallel, one fully-connected network for each of the detected actors, to reconstruct complete three-dimensional poses of the actors;
performing sequential model fitting on the plurality of images, wherein the sequential model fitting is based on results of running the initial network and the fully-connected networks;
determining, based on the sequential model fitting, a locational position for a camera in which the camera has a view of a possible point of collision of two or more of the actors; and
instructing the camera to be positioned in the locational position.

2. The computer-implemented method of claim 1, wherein the determination of the locational position for the camera is based on a training model, wherein the training model is based on a second plurality of images captured by a camera positioned in a second locational position with a view of a collision of a plurality of other actors depicted in the second plurality of images.

3. The computer-implemented method of claim 1, wherein the initial network is a convolutional neural network.

4. The computer-implemented method of claim 3, wherein the convolutional neural network includes a plurality of two-dimensional kernels and a plurality of three-dimensional kernels, wherein at least some of the two-dimensional kernels are applied to determine the body joints of the detected actors, wherein at least some of the three-dimensional kernels are applied to determine a number of layers that exist in the plurality of images.

5. The computer-implemented method of claim 1, wherein performing sequential model fitting on the plurality of images includes using kinematic skeleton fitting to obtain temporally coherent motion capture results.

6. The computer-implemented method of claim 5, wherein the temporally coherent motion capture results are selected from the group consisting of: localizations of the actors relative to the camera, a joint angle parameterization of the actors, and a possible point of collision of two or more of the actors.

7. The computer-implemented method of claim 5, wherein determining, based on the sequential model fitting, the locational position for the camera in which the camera has a view of the possible point of collision of two or more of the actors includes: applying the coherent motion capture results into a predetermined regression network.

8. A computer program product, the computer program product comprising a computer readable storage medium having program instructions embodied therewith, the program instructions readable and/or executable by a computer to cause the computer to:

run, by the computer, an initial network on a plurality of images to detect actors pictured therein and body joints of the detected actors;

run, by the computer, fully-connected networks in parallel, one fully-connected network for each of the detected actors, to reconstruct complete three-dimensional poses of the actors;

perform, by the computer, sequential model fitting on the plurality of images, wherein the sequential model fitting is based on results of running the initial network and the fully-connected networks;

determine, by the computer, based on the sequential model fitting, a locational position for a camera in which the camera has a view of a possible point of collision of two or more of the actors; and instruct, by the computer, the camera to be positioned in the locational position.

9. The computer program product of claim 8, wherein the determination of the locational position for the camera is based on a training model, wherein the training model is based on a second plurality of images captured by a camera positioned in a second locational position with a view of a collision of a plurality of other actors depicted in the second plurality of images.

10. The computer program product of claim 8, wherein the initial network is a convolutional neural network.

11. The computer program product of claim 10, wherein the convolutional neural network includes a plurality of two-dimensional kernels and a plurality of three-dimensional kernels, wherein at least some of the two-dimensional kernels are applied to determine the body joints of the detected actors, wherein at least some of the three-dimensional kernels are applied to determine a number of layers that exist in the plurality of images.

12. The computer program product of claim 8, wherein performing sequential model fitting on the plurality of images includes using kinematic skeleton fitting to obtain temporally coherent motion capture results.

13. The computer program product of claim 12, wherein the temporally coherent motion capture results are selected from the group consisting of: localizations of the actors relative to the camera, a joint angle parameterization of the actors, and a possible point of collision of two or more of the actors.

14. The computer program product of claim 12, wherein determining, based on the sequential model fitting, the locational position for the camera in which the camera has a view of the possible point of collision of two or more of the actors includes: applying the coherent motion capture results into a predetermined regression network.

15. A system, comprising:

a processor; and logic integrated with the processor, executable by the processor, or integrated with and executable by the processor, the logic being configured to:

run an initial network on a plurality of images to detect actors pictured therein and body joints of the detected actors;

run fully-connected networks in parallel, one fully-connected network for each of the detected actors, to reconstruct complete three-dimensional poses of the actors;

perform sequential model fitting on the plurality of images, wherein the sequential model fitting is based on results of running the initial network and the fully-connected networks;

determine, based on the sequential model fitting, a locational position for a camera in which the camera has a view of a possible point of collision of two or more of the actors; and instructing the camera to be positioned in the locational position.

16. The system of claim 15, wherein the determination of the locational position for the camera is based on a training model, wherein the training model is based on a second plurality of images captured by a camera positioned in a second locational position with a view of a collision of a plurality of other actors depicted in the second plurality of images.

17. The system of claim 15, wherein the initial network is a convolutional neural network.

18. The system of claim 17, wherein the convolutional neural network includes a plurality of two-dimensional kernels and a plurality of three-dimensional kernels, wherein at least some of the two-dimensional kernels are applied to determine the body joints of the detected actors, wherein at least some of the three-dimensional kernels are applied to determine a number of layers that exist in the plurality of images.

19. The system of claim 15, wherein performing sequential model fitting on the plurality of images includes using kinematic skeleton fitting to obtain temporally coherent motion capture results.

20. The system of claim 19, wherein the temporally coherent motion capture results are selected from the group consisting of: localizations of the actors relative to the camera, a joint angle parameterization of the actors, and a possible point of collision of two or more of the actors.

* * * * *